United States Patent
Telborn (10) Patent No.: US 9,376,978 B2
(45) Date of Patent: Jun. 28, 2016

(54) METHOD WHEN DRIVING A VEHICLE AND A COMPUTER PROGRAM FOR THIS, A SYSTEM FOR IMPLEMENTING THE METHOD AND A VEHICLE COMPRISING THE SYSTEM

(71) Applicant: Scania CV AB, Södertälje (SE)

(72) Inventor: Klas Telborn, Södertälje (SE)

(73) Assignee: SCANIA CV AB (SE)

( * ) Notice: Subject to any disclaimer, the term of this patent is extended or adjusted under 35 U.S.C. 154(b) by 42 days.

(21) Appl. No.: 14/409,548

(22) PCT Filed: Jul. 4, 2013

(86) PCT No.: PCT/SE2013/050868
§ 371 (c)(1),
(2) Date: Dec. 19, 2014

(87) PCT Pub. No.: WO2014/007750
PCT Pub. Date: Jan. 9, 2014

(65) Prior Publication Data
US 2015/0152803 A1    Jun. 4, 2015

(30) Foreign Application Priority Data
Jul. 5, 2012    (SE) ....................... 1250774

(51) Int. Cl.
*F02D 41/14*    (2006.01)
*F02D 41/00*    (2006.01)
(Continued)

(52) U.S. Cl.
CPC ........ *F02D 41/1401* (2013.01); *F02D 41/0002* (2013.01); *F02D 41/0007* (2013.01);
(Continued)

(58) Field of Classification Search
CPC ..... F02D 41/00; F02D 41/0002; F02D 41/14; F02D 41/1401; F02D 41/1454; F02D 41/1495; F02D 41/2454
USPC .......... 701/101–105, 114, 115; 123/429, 434, 123/676, 677, 681
See application file for complete search history.

(56) References Cited

U.S. PATENT DOCUMENTS

| | | | |
|---|---|---|---|
| 4,434,768 A | 3/1984 | Ninomiya | 123/489 |
| 6,095,127 A | 8/2000 | Kolmanovsky et al. | 123/676 |
| 6,318,083 B1 | 11/2001 | Machida et al. | 60/601 |
| 7,063,076 B1 | 6/2006 | Sun | 123/478 |
| 7,281,518 B1 | 10/2007 | Allain et al. | 123/434 |
| 2002/0020396 A1 | 2/2002 | Sakamoto | 123/492 |

(Continued)

FOREIGN PATENT DOCUMENTS

| | | |
|---|---|---|
| EP | 1 460 251 A2 | 9/2004 |
| WO | WO 2005/049996 A1 | 6/2005 |
| WO | WO 2008/140393 A1 | 11/2008 |

OTHER PUBLICATIONS
International Search Report mailed Nov. 8, 2013 in corresponding PCT International Application No. PCT/SE2013/050868.

*Primary Examiner* — John Kwon
*Assistant Examiner* — Johnny H Hoang
(74) *Attorney, Agent, or Firm* — Ostrolenk Faber LLP (57) ABSTRACT

A method operable when driving a vehicle, wherein the vehicle has an internal combustion engine with at least one combustion chamber as well as an air supply to said combustion chamber that can be controlled, wherein, when driving said vehicle, an air/fuel ratio in said combustion chamber is controlled such that said air/fuel ratio does not fall below a first limit value ($\lambda_b$), and wherein said air/fuel ratio is also controlled such that a first margin ($\Delta\lambda_{m0}$) with respect to said first limit value ($\lambda_b$) is maintained. The method includes determining a first measure (M) of a requirement for a margin with respect to said first limit value ($\lambda_b$), and if said first measure (M) of said requirement represents a reduced requirement for a margin with respect to said first limit value, reducing said first margin ($\Delta\lambda_{m0}$) with respect to said first limit value ($\lambda_b$) to a second margin being smaller than said first margin.

19 Claims, 5 Drawing Sheets

(51) Int. Cl.
   *F02D 41/04*   (2006.01)
   *F02D 41/10*   (2006.01)

(52) U.S. Cl.
   CPC .............. *F02D41/045* (2013.01); *F02D 41/10* (2013.01); *F02D 41/1475* (2013.01); *F02D 41/1497* (2013.01); *F02D 2200/0625* (2013.01); *F02D 2250/21* (2013.01); *F02D 2250/32* (2013.01); *F02D 2250/38* (2013.01); *Y02T 10/144* (2013.01); *Y02T 10/42* (2013.01)

(56) References Cited

U.S. PATENT DOCUMENTS

| | | | |
|---|---|---|---|
| 2004/0016419 A1 | 1/2004 | Satou et al. | 123/492 |
| 2005/0131620 A1 | 6/2005 | Bowyer | 701/108 |
| 2006/0150962 A1* | 7/2006 | Uraki | F02D 41/1456 123/679 |
| 2009/0037079 A1* | 2/2009 | Suzuki | F02D 41/008 701/103 |
| 2010/0211295 A1 | 8/2010 | Ide et al. | 701/108 |

* cited by examiner

METHOD WHEN DRIVING A VEHICLE AND A COMPUTER PROGRAM FOR THIS, A SYSTEM FOR IMPLEMENTING THE METHOD AND A VEHICLE COMPRISING THE SYSTEM

CROSS-REFERENCE TO RELATED APPLICATIONS

The present application is a 35 U.S.C. §§371 National Phase conversion of PCT/SE2013/050868, filed Jul. 4, 2013, which claims priority of Swedish Patent Application No. 1250774-5, filed Jul. 5, 2012, the contents of which are incorporated by reference herein. The PCT International Application was published in the English language.

FIELD OF THE INVENTION

The present invention relates to a method and a system when driving a vehicle. The invention relates especially to a method and a system when driving a vehicle in which air supply to a combustion chamber of an internal combustion engine can be actively influenced. The present invention also relates to a vehicle, and to a computer program and a computer program product, which implement the method according to the invention.

BACKGROUND OF THE INVENTION

For driving heavy vehicles, such as trucks, buses and the like, vehicle economy has over time had an ever increasing impact on the profitability of the enterprise in which the vehicle is used. In addition to the cost of procurement of the vehicle, it is generally the case that the main items of expenditure for the running of a vehicle are the pay given to the driver of the vehicle, costs of repairs and maintenance, and fuel for propulsion of the vehicle.

Depending on the type of vehicle, different factors can have different levels of impact, but the fuel consumption is generally a substantial item of expenditure, and, since the degree of utilization of heavy vehicles is often high, associated with considerable overall fuel consumption, the fuel costs can have a very great impact on profitability for an owner of the vehicle, for example a haulage company or the like.

Therefore, every possibility of reducing the fuel consumption can have a positive effect on profitability, and, especially in long-distance driving, it is especially important to optimize the fuel consumption. For example, for this purpose, long-distance vehicles are produced which are characterized by a typical cruising speed for the internal combustion engine, where the cruising speed is adapted for a certain operating speed. Typical operating speeds, depending on the region and/or type of road, can be, for example, 80 km/h, 85 km/h or 89 km/h.

In addition to fuel economy, it is becoming more and more important, in heavy vehicles, that the driver of the vehicle finds the driving experience comfortable and intuitive. For example, the use of automatically changing transmissions, where the change of gear is controlled completely or partially by the control system usually present in the vehicle, can make driving the vehicle easier.

Automatic gear change also permits further freedom in controlling the progress of the vehicle from the perspective of fuel economy, for example by using the control system of the vehicle to ensure that the vehicle is driven in a gear that is advantageous from the point of view of fuel economy.

However, good comfort for the driver also entails other aspects, for example ensuring that good driveability is achieved, i.e. that the vehicle, upon demand and/or upon various commands from the driver, responds in a manner expected by the driver, and also without undesired delay.

SUMMARY OF THE INVENTION

It is an object of the present invention to provide a method when driving a vehicle that can further reduce the fuel consumption of vehicles driven by an internal combustion engine, which method at the same time permits good driveability when operating the vehicle.

The present invention relates to a method when driving a vehicle, wherein said vehicle comprises an internal combustion engine with at least one combustion chamber, wherein air supply to said combustion chamber can be controlled, wherein, when driving said vehicle, an air/fuel ratio in said combustion chamber is controlled such that said air/fuel ratio does not fall below a first limit value, and wherein said air/fuel ratio is controlled such that a first margin with respect to said first limit value is maintained.

The method includes determining a first measure of a requirement for a margin with respect to said first limit value, and if said first measure of said requirement represents a reduced requirement for a margin with respect to said first limit value, reducing said first margin with respect to said first limit value to a second margin being smaller than said first margin.

Said control of the air/fuel ratio such that said first margin with respect to said first limit value is maintained can be controlled at least partially by controlling the pressure and/or flow of the air supplied to said combustion chamber.

The air/fuel ratio is preferably an air/fuel ratio between the air and fuel supplied to said combustion chamber, and it can be controlled, for example, per combustion cycle or as a mean value for a plurality of successive combustions.

As has been mentioned above, it is desirable that a vehicle can be driven in a way that is as fuel-efficient as possible, and, as long as the vehicle is being driven along a horizontal road, the fuel efficiency of the vehicle is principally controlled by how close to optimal efficiency the internal combustion engine is working.

At the same time, it is important that the vehicle has good driveability and, for example upon torque demand from the driver of the vehicle, quickly responds with a corresponding increase in the transmitted torque.

Modern engines, for example modern diesel engines, are dependent on a compression of the combustion air supplied for combustion in order that a high torque/high power will be able to be transmitted. In order to allow the engine to work more "optimally", for example from the point of view of fuel consumption, this compression can often be regulated via, for example, a VGT (Variable Geometry Turbocharger), a turbo unit with waste gate, an electrical turbo or another corresponding function. The present invention is generally applicable where compression and/or air flow can be regulated.

Moreover, there are often regulations governing the emission of substances/particles, which mean that the air/fuel ratio must at least reach a first limit value in order for these regulations to be satisfied. In addition, the engine function often at least requires that the air/fuel ratio reaches at least a first limit value in order to ensure a good function.

If the air/fuel ratio is about to fall below said first limit value, the supply of fuel is throttled so as not to fall below this first limit while waiting for the supplied amount of air to increase so that a greater amount of fuel can be supplied. Since the torque transmitted by the internal combustion engine is more or less directly proportional to the amount of fuel supplied, driveability is affected by this throttling of the fuel supply, and the throttling is therefore undesired.

Therefore, a margin usually has to be applied with respect to this limit value in order to allow good driveability to be achieved, i.e. in order to be able to obtain a required torque directly without sustained throttling of the fuel supply. That is to say, an air margin is provided, such that a certain increase in a supplied amount of fuel can be effected without the air/fuel ratio falling below said limit value, which means that the power of the internal combustion engine can be made available more quickly. However, a disadvantage of applying an air margin of this kind is that the vehicle will often be driven with unnecessarily high losses on account of greater gas exchange work.

This applies especially when the vehicle is driven under substantially stationary conditions, without transient increases in the need for driving power.

According to the present invention, losses occasioned by gas exchange work are reduced by virtue of the fact that, when a first measure of said requirement for a margin with respect to said first limit value represents a reduced requirement for a margin with respect to said first limit value, the air/fuel ratio margin with respect to said first limit value is reduced, such that in this way losses from the gas exchange work also decrease, with reduced fuel consumption as a result.

By effecting this reduction of the air/fuel ratio margin at suitable times when there is less need for a margin with respect to said first limit value, it is possible to ensure that the margin is only reduced in situations where a sudden increase in the torque demand is not expected, and where there is therefore also less likelihood of the driver experiencing poor driveability.

Said first measure of a requirement for a margin with respect to said first limit value when driving said vehicle is thus determined under conditions when there is no transient, i.e. sudden, increase in the torque transmitted by the internal combustion engine.

Therefore, said first margin with respect to said first limit value can be arranged to be reduced only when a sudden increase in the torque demand from said internal combustion engine is not expected, for example when said vehicle is driven under substantially stationary conditions.

Moreover, the method according to the present invention can also involve driving the vehicle at said reduced margin with respect to said first limit value until a new margin with respect to said first limit value is determined, based on a new measure of the requirement for a margin with respect to said first limit value.

Further features of the present invention and advantages thereof will become clear from the following detailed description of illustrative embodiments and from the attached drawings.

DETAILED DESCRIPTION OF EMBODIMENTS

Figure 1A:
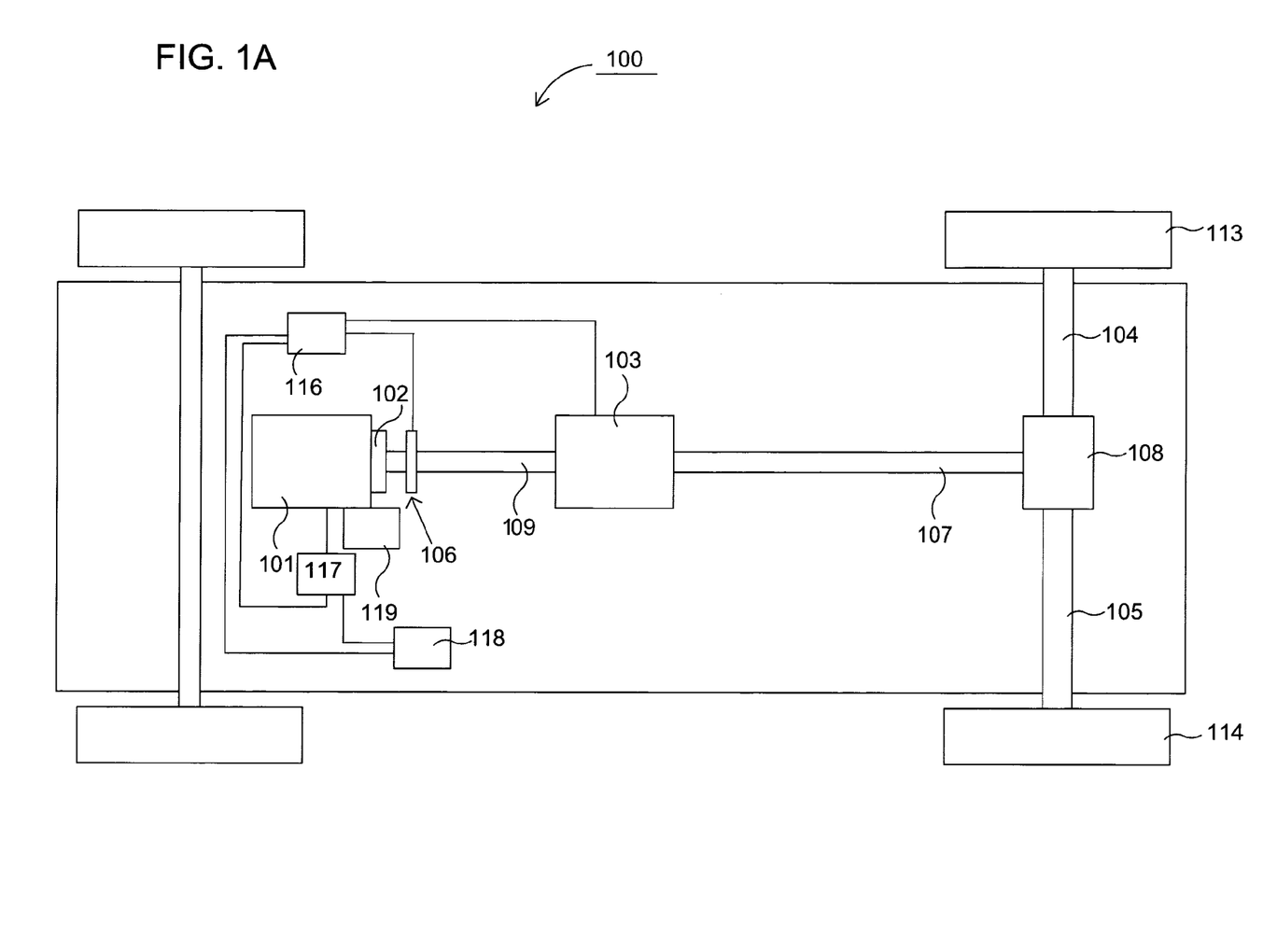
FIG. 1A shows a drive train in a vehicle in which the present invention can be used.

FIG. 1A shows schematically a drive train in a vehicle 100 according to one embodiment of the present invention. The vehicle 100 shown schematically in FIG. 1A comprises only one axle 104, 105 with driving wheels 113, 114, but the invention is also applicable to vehicles where more than one axle is provided with driving wheels, and also to vehicles with one or more additional axles, for example one or more support axles. The drive train comprises an internal combustion engine 101, which in a conventional way, via an output shaft on the internal combustion engine 101, usually via a flywheel 102, is connected to a gearbox 103 via a clutch 106. The clutch 106 can be a manually or automatically controlled clutch in a known manner, and the gearbox 103 can be arranged to be changed by the driver of the vehicle 100 or automatically by the control system of the vehicle. According to an alternative embodiment, the vehicle 100 is provided with a clutch-free drive train.

An shaft 107 leading from the gearbox 103 then drives the driving wheels 113, 114 via a final gear 108, for example a conventional differential, and drive shafts 104, 105 connected to said final gear 108.

The present invention relates to internal combustion engines, especially diesel engines, where the amount of air supplied to a combustion chamber, for example a cylinder, can be actively regulated.

In a diesel engine without the possibility of actively regulating the air supplied for combustion, i.e. without the possibility of compressing (supercharging) the air supplied for combustion, the combustion air available in the combustion consists of the air that is sucked in during downward movement of the piston, where this intake air consists of air sucked in from the surroundings of the vehicle. The amount of air in the combustion is thus substantially the same for each combustion cycle (where variations may arise, e.g. because of external factors such as prevailing air pressure, temperature, etc.).

This means that only a certain amount of fuel can be injected before the air/fuel ratio (AFR) of the combustion becomes undesirably low. The ratio between a stoichiometric ratio $AFR_{stoich}$ and the actual ratio between air and fuel supplied for combustion (the quotient between the mass of air (kg) and gasoline (kg) supplied for the combustion) is generally called the lambda value, $\lambda$, where the lambda value is defined as $$\lambda = \frac{AFR}{AFR_{stoich}}.$$

As is well known, and as is clear from the equation, a lambda value=1 signifies a fuel/air ratio where stoichiometric combustion is obtained, i.e. $AFR=AFR_{stoich}$, and where higher or lower lambda values signify excess air or undersupply of air in the combustion.

As is known, however, there are methods for increasing the power of diesel engines, for example, by compressing the air supplied for the combustion in order to supply a greater air mass for the combustion, wherein the greater air mass means that a correspondingly larger amount of fuel can be supplied while maintaining the air/fuel ratio, with higher power development as a result.

As is known, the compression of the supplied air can be achieved in different ways. For example, the compression can be achieved with the aid of a turbo unit 119, for example a VGT (variable geometry turbocharger) unit, by means of which the desired compression, i.e. the desired pressurization of the combustion air, can be achieved by varying the geometry of the turbine such that a resulting desired pressure, or charging pressure, of the air supplied for combustion is generated.

Alternatively, the turbo unit 119 can, for example, be a turbo unit with a waste gate, by means of which a desired quantity of exhaust gas flow can be conveyed past the turbine, wherein regulation of the diverted flow can be used to regulate the work of the turbine and, consequently, the resulting charging pressure.

With the aid of turbo units of this kind for example, or of other suitable turbo units, e.g. an electrical turbo, etc., it is thus possible to regulate compression, and therefore the lambda value $\lambda$, even for a specific operating point where the supplied amount of fuel is kept constant, but where the lambda value $\lambda$ is thus varied by varying the supplied amount of air, by varying the air pressure. In other words, the lambda value $\lambda$ can be regulated for a situation, for example, in which the vehicle is driven at a certain speed, which in turn means that a certain driving power is needed, and therefore a certain flywheel torque.

However, an increase in the lambda value $\lambda$ in such a situation usually requires an increase in the amount of fuel supplied, since supply of a greater amount of air will result in greater gas exchange work, with the losses associated therewith, which can mean that an increase in the amount of fuel supplied is needed in order to overcome losses caused by greater gas exchange work if the desired flywheel torque is still to be reached. At the same time, however, a certain compression usually always has to be present in order for the vehicle to have good driveability. The present invention, however, relates to a method for reducing the negative impact of losses in gas exchange work while at the same time still retaining good driveability.

Figure 2:
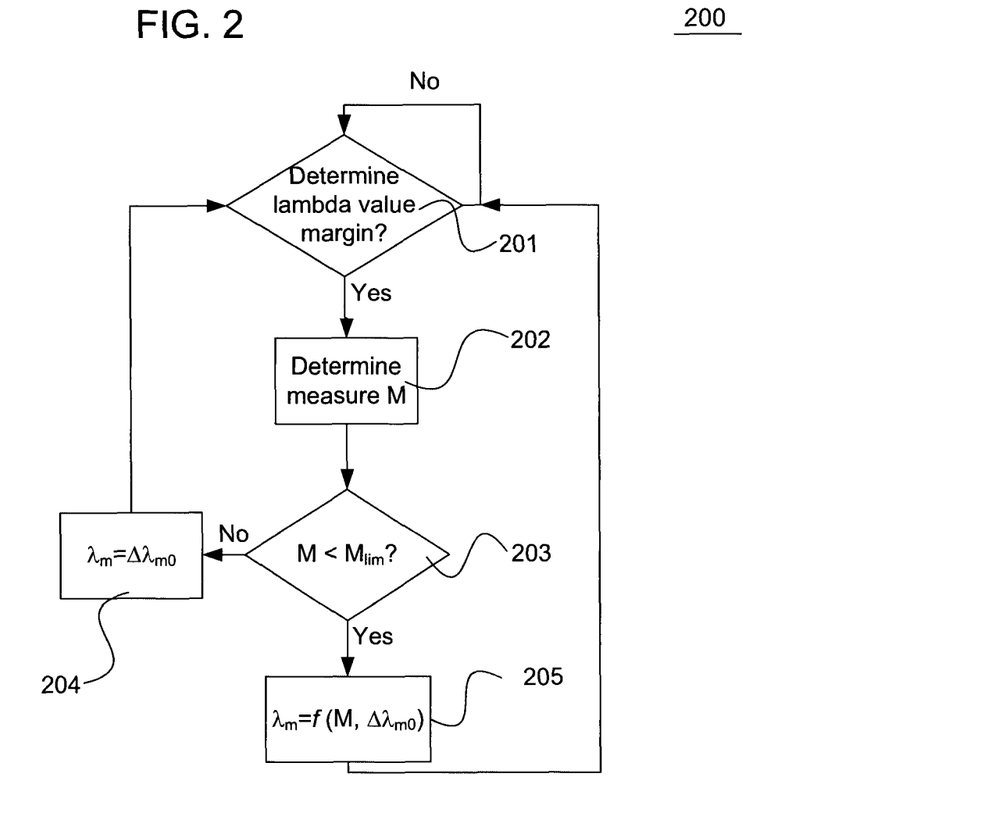
FIG. 2 shows an exemplary method according to the present invention.

An example of the method 200 according to the present invention is shown in FIG. 2. The invention can be implemented in any suitable control unit, for example the control unit 117 shown in FIG. 1A.

Generally speaking, control systems in modern vehicles usually consist of a communications bus system consisting of one or more communications buses for interconnecting a number of electronic control units (ECU), or controllers, and various components arranged on the vehicle. Such a control system can comprise a large number of control units, and the responsibility for a specific function can be divided amongst more than one control unit.

For simplicity, FIG. 1A shows only the control units 116, 117, 118, but vehicles 100 of the disclosed kind often comprise considerably more control units, which is well known to a person skilled in the art.

In the present example, the clutch is an automatically controlled clutch, wherein the control unit 116 controls the clutch 106 via a clutch actuator (not shown), and also the gearbox 103. The control unit 118 is responsible for one or more cruise control functions. These cruise control functions can be of different types, and, according to one embodiment the cruise control function is of a conventional type. According to one embodiment, the cruise control function consists of a cruise control that uses what is called a Look Ahead function. A Look Ahead Cruise Control (LACC) is a cruise control that uses knowledge of the road section ahead, that is to say knowledge of the road topology, curvature, properties, etc., ahead of the vehicle, in order to adapt the speed of the vehicle according to variations of the road along which the vehicle is being driven.

The control unit 117, in which the present invention in the embodiment shown is implemented, controls the engine 101 of the vehicle 100. The invention can alternatively be implemented in a control unit dedicated to the present invention or entirely or partially in one or more other control units already present on the vehicle 100.

The control of a margin for an air/fuel ratio according to the present invention by the control unit 117 (or the one or more control units on which the present invention is implemented) will probably depend on signals which are received from other control units (also not shown control units) arranged on the vehicle, and/or information from, for example, various detectors/sensors arranged on the vehicle. It is generally the case that control units of the type shown are normally arranged to receive sensor signals from different parts of the vehicle 100.

Control units of the type shown are also usually arranged to output control signals to different vehicle parts and vehicle components.

The control is often controlled by programmed instructions. These programmed instructions typically consist of a computer program which, when it is executed in a computer or control unit, causes the computer/control unit to perform the desired control, such as method steps according to the present invention. The computer program is usually part of a computer program product, where the computer program product comprises a suitable storage medium 121 (see FIG. 1B) with the computer program 126 stored on said storage medium 121. Said digital storage medium 121 can be, for example, one from the following group: ROM (Read-Only Memory), PROM (Programmable Read-Only Memory), EPROM (Erasable PROM), Flash memory, EEPROM (Electrically Erasable PROM), a hard-disk unit, etc., and can be arranged in or connected to the control unit, wherein the computer program is executed by the control unit. By changing the instructions of the computer program, it is thus possible to adapt the performance of the vehicle in a specific situation.

Figure 1B:
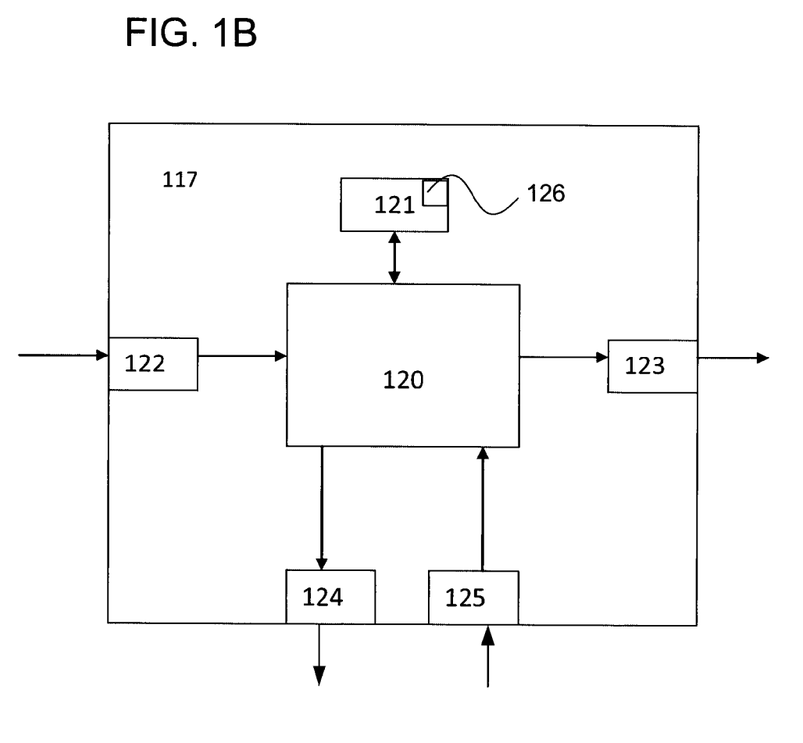
FIG. 1B shows a control unit in a vehicle control system.

An example of a control unit (the control unit 117) is shown schematically in FIG. 1B, wherein the control unit in turn can comprise a computing unit 120, which can be in the form, for example, of any suitable type of processor or microcomputer, for example a circuit for digital signal processing (Digital Signal Processor, DSP), or a circuit having a predetermined specific function (Application Specific Integrated Circuit, ASIC). The computing unit 120 is connected to a memory unit 121, which provides the computing unit 120 with, for example, the stored program code 126 and/or the stored data that the computing unit 120 requires in order to be able to perform computations. The computing unit 120 is also arranged to store partial or final results of computations in the memory unit 121.

In addition, the control unit 117 is provided with devices 122, 123, 124, 125 for receiving and transmitting input and output signals. These input and output signals can contain waveforms, impulses, or other attributes which, by the devices 122, 125 for the reception of input signals, can be detected as information for processing by the computing unit 120. The devices 123, 124 for the transmission of output signals are arranged to convert computation results from the computing unit 120 to output signals for transmission to other parts of the control system of the vehicle and/or the one or more components for which the signals are intended. Each of the connections to the devices for receiving and transmitting input and output signals can be in the form of one or more of a cable; a data bus, such as a CAN bus (Controller Area Network bus), a MOST bus (Media Oriented Systems Transport bus), or some other bus configuration; or by a wireless connection.

Returning to the method 200 shown in FIG. 2, this begins at step 201, where it is determined whether a lambda value margin $\Delta\lambda_m$ is to be determined.

As has been mentioned above, an increase in the lambda value $\lambda$ usually requires greater compression of the combustion air, with the result that a larger amount of fuel is needed in order to compensate for losses in gas exchange work. At the same time, a certain lambda value $\lambda$ is needed for the vehicle to be able to be driven with good driveability.

Figure 3A:
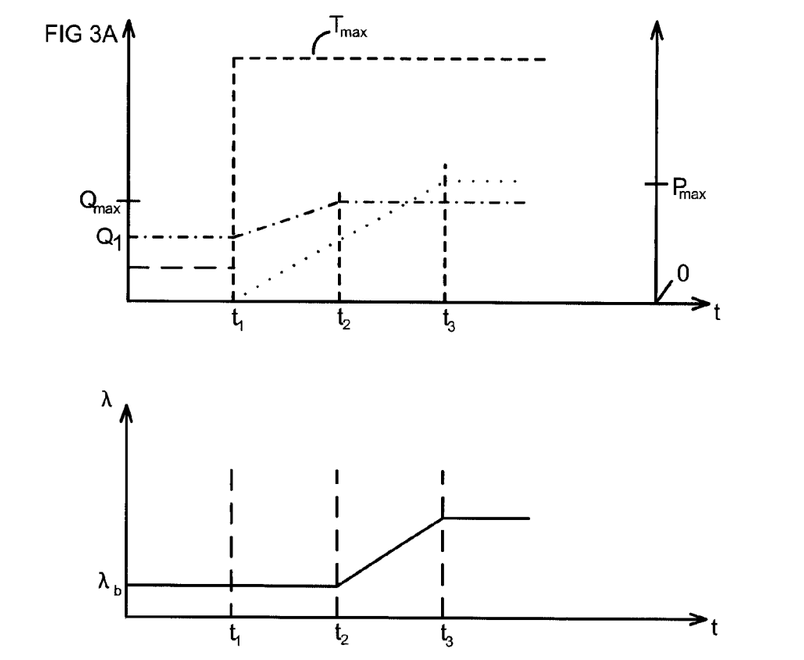
FIGS. 3A-3B show driving a vehicle along an example of a road section.
Figure 3B:
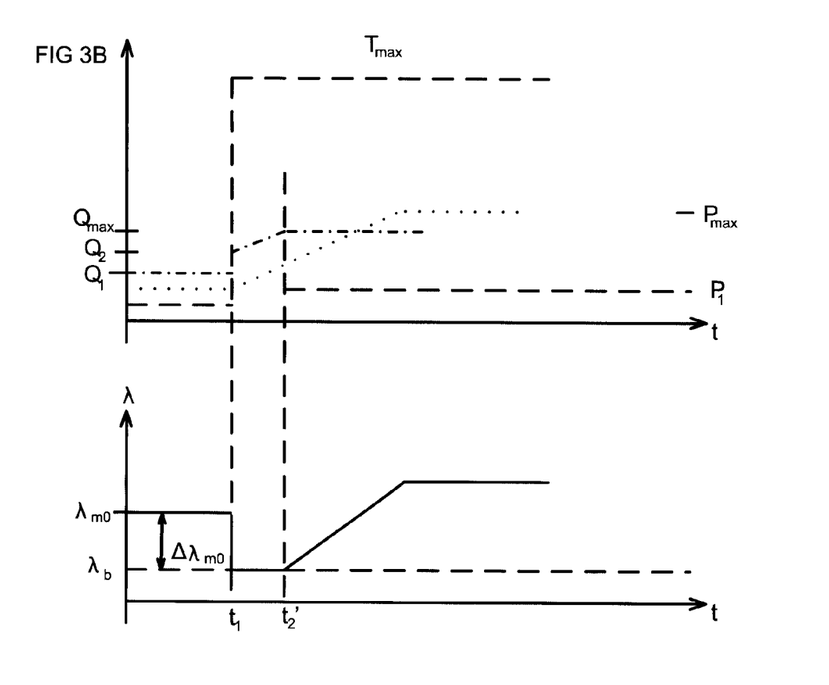

This is illustrated in FIGS. 3A-B. FIG. 3A shows how the lambda value $\lambda$, the supplied amount of fuel Q and the charging pressure P (i.e. the pressure of the air supplied for combustion, dotted line) vary with time. Up to the time $t=t_1$, the vehicle is driven at a relatively low driving power requirement, with an associated relatively low fuel supply $Q_1$, while at the same time the combustion air is supplied with relatively low or no overpressure. At the same time, $\lambda$ lies at a level corresponding substantially to the lowest lambda value $\lambda_b$ that is permitted from the point of view of smoke limitation or other points of view.

It is generally the case that, for vehicles of the type shown in FIG. 1A, there are usually legal requirements concerning emissions, which legal requirements can, for example, limit the permitted occurrence of, for example, particles and/or other compounds. For example, a certain level of the lambda value $\lambda$ may be needed in order to satisfy legal requirements of this kind. For example, combustion with too low a lambda value $\lambda$ will result in undesired development of smoke caused by undesired emissions. For this reason, the lowest permitted lambda value is usually limited to a first level $\lambda_b$ when driving the vehicle. For example, this lowest level $\lambda_b$ can be somewhere in the range $\lambda=1.2-1.5$ or in the range $\lambda=1.3-1.5$. This means that the lambda value $\lambda$ when controlling the internal combustion engine is not allowed to fall below the level $\lambda_b$, since existing requirements would then no longer be fulfilled.

At the time $t_1$ in FIG. 3A, there is a marked increase in the torque demand T of the vehicle 100, e.g. because the driver of the vehicle 100 requires full torque $T_{max}$ for rapid acceleration of the vehicle 100.

When this happens, there is a need for greater fuel supply from the level $Q_1$ to the level $Q_{max}$ in order to be able to provide the desired torque. However, the fuel supply cannot be immediately increased to the level $Q_{max}$ since the lambda value $\lambda$ already lies at the minimum level $\lambda_b$, and supplying a greater amount of fuel than the level $Q_1$ would cause the lambda value $\lambda$ to fall to an inadmissible level below $\lambda_b$.

When the lambda value $\lambda$, as in FIG. 3A, thus lies at or near the limit value $\lambda_b$, the supply of fuel for combustion is limited such that $\lambda_b$ is not undershot, which in turn means that the internal combustion engine cannot transmit the required torque before the lambda value $\lambda$ permits the desired fuel level. According to the above, $\lambda$ is directly dependent on the amount of air supplied, which in turn is directly dependent on the existing compression (pressure) of the air which is supplied for combustion.

At the time $t_1$, a build-up of the combustion air pressure $P_{in}$ begins, wherein this pressure increase has the effect that a greater amount of air can be supplied for combustion. In line with the air pressure increasing after the time $t_1$, the amount of fuel Q can therefore be increased in accordance with a ratio in which $\lambda$ is kept constant at the level $\lambda_b$ as shown in FIG. 3A. At the time $t_2$, the level $Q_{max}$ is reached, which represents, for example, the maximum fuel level that can be supplied to the internal combustion engine in accordance with the engine specifications, or the level that is required for the desired torque to be transmitted. Thus, it is only at the time $t_2$ that maximum power can be developed by the internal combustion engine and the driver's request be met in full.

After the time $t_2$, the air pressure continues to be built up, which means that the lambda value $\lambda$ again comes to rise above the level $\lambda_b$.

In a situation of the type shown in FIG. 3A, the combustion air pressure first has to be built up before the desired amount of air can be supplied, and the desired power thereby be obtained. The scenario shown in FIG. 3A therefore has the disadvantage that maximum power is not available directly when the driver requires it, at the time $t_1$, but instead only at the time $t_2$, which means that the driving experience obtained by the driver of the vehicle is not optimal, and such situations give rise to poor driveability since the vehicle, in situations of this type, is felt to be weak and unresponsive, despite the fact that the vehicle is actually capable of transmitting a high torque.

For this reason, a method according to FIG. 3B is usually applied in which the lambda value $\lambda$ is not allowed to fall to the level $\lambda_b$ before an increase in the combustion air pressure has begun, but instead this is already done when $\lambda$ falls to a level $\lambda_{m0}$, which is a higher level compared to $\lambda_b$. That is to say, the lambda value $\lambda$ is not allowed to fall below the level $\lambda_{m0}$ in static driving of the vehicle. According to the method shown in FIG. 3B, a lambda margin $\Delta\lambda_m$ is therefore applied, in this case $\Delta\lambda_{m0}=\lambda_{m0}-\lambda_b$. This lambda margin $\Delta\lambda_m$ can, for example, lie in the range 0.3-0.5 $\lambda$. By proceeding in the manner shown in FIG. 3B instead, a certain charging pressure $P_1$ will be present in order to keep the lambda value at a level at least corresponding to the level $\lambda_{m0}$.

This means that, in the event of a load increase of the type shown in FIG. 3A, an air surplus is directly available that can be utilized for increased fuel injection. This means that the fuel supply can be directly increased to the level $Q_2$ before the lambda value falls to the limit value $\lambda_b$. At the same time, the build-up of air pressure continues, and in this case maximum fuel supply/maximum torque is achieved already at the time $t_2'$. With the aid of such a lambda margin $\Delta\lambda_{m0}$, the available power of the internal combustion engine 101 can thus be made available more quickly, as is illustrated in FIG. 3B, with improved driveability as a result. However, a disadvantage of applying such a lambda margin $\Delta\lambda_m$ is that greater losses occur because of increased gas exchange work. Improved driveability is thus achieved at the cost of poorer fuel economy.

According to the present invention, the advantages of using said lambda margin $\Delta\lambda_m$ are retained, while at the same time the fuel efficiency is improved. This is achieved by reducing or completely eliminating the lambda value margin $\Delta\lambda_m$ in situations where it is considered that the effect of such a reduction on the driveability of the vehicle is minimal or non-existent.

If it is determined in step 201 that a lambda value margin $\Delta\lambda_m$ is to be determined, the method continues to step 202. The transition from step 201 to step 202 can be controlled by any suitable condition. For example, the transition can take place as soon as the internal combustion engine of the vehicle is started, i.e. the lambda value margin can be arranged to be determined continuously as soon as the vehicle is running. Alternatively, for example, the transition can take place when the speed of the vehicle exceeds some suitable speed, or when the existing drive resistance of the vehicle falls below some suitable drive resistance. The transition can also take place on the basis of some other suitable condition.

Then, in step 202, a measure M of the requirement for a lambda value margin $\Delta\lambda_m$, is determined, which can also be seen as a requirement for a necessary response. In this connection, response means the way in which the vehicle comes to respond to a demand for increased driving power. If the vehicle (the internal combustion engine) can immediately provide a high torque, as in FIG. 3B, the vehicle also has a high, i.e. quick, response, which results for example in faster acceleration. Conversely, if it takes a comparatively long time for the internal combustion engine to build up the desired driving power, since build-up of turbo pressure is needed, etc., as in FIG. 3A, this represents a low, i.e. slow, response. For example, it can take several seconds before the desired turbo pressure manages to be built up, with a corresponding delay until full power can be developed by the internal combustion engine, and thus also a delay in the desired acceleration.

Figure 4:
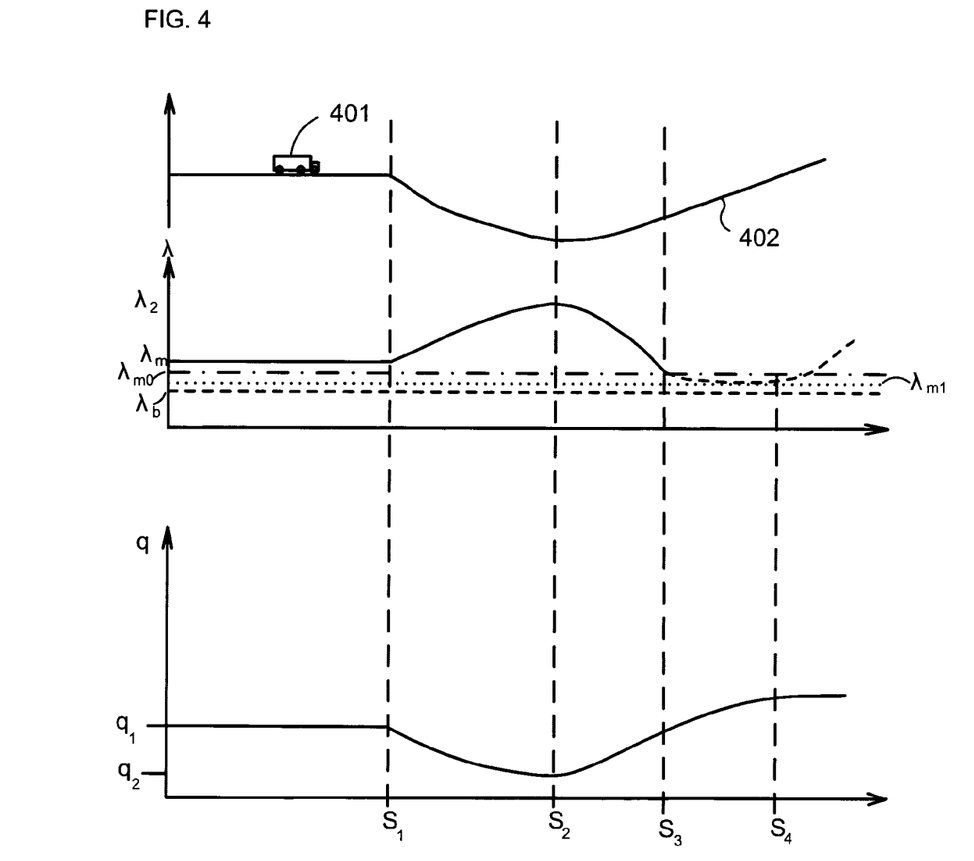
FIG. 4 shows a change in the air/fuel ratio upon application of the present invention.

FIG. 4 shows an example of a vehicle 401 which is driven along a road 402. The figure also shows how $\lambda$ varies when driving the vehicle 401 along the road 402, and how the fuel supply Q varies when driving said vehicle. The present invention is not initially activated in the driving situation in FIG. 4. Up to the position $S_1$, the vehicle is driven along a substantially horizontal road, wherein a fuel amount $Q_1$ is supplied, and wherein $\lambda$ lies at the level $\lambda_m$ exceeding the lowest permitted lambda value $\lambda_b$. In the example, it is assumed, for simplicity, that the invention is activated at the time $S_1$.

At the position $S_1$, the vehicle 401 reaches a downward slope, which ends at the position $S_2$. During travel on the downward slope, the fuel supply falls to a level $Q_2$, while at the same time the lambda value $\lambda$, on account of the reduced fuel supply, rises to a level $\lambda_2$. At position $S_2$, the downward slope changes to an upward slope, which entails an increased drive resistance, with the result that the fuel supply Q increases in order to maintain constant speed. At the same time as the fuel supply Q increases, $\lambda$ decreases and, at the position $S_3$, reaches the lambda limit $\lambda_{m0}$. In this situation, according to the prior art, action is taken directly to increase $\lambda$, i.e. action is taken to increase the amount of air supplied for combustion in the internal combustion engine, for the purpose of avoiding $\lambda$ falling to the level $\lambda_b$, with the low response associated therewith, as described above.

According to the present invention, step 202 instead includes determining a measure M of the required lambda margin, which can be arranged to be done continuously, after which the method continues to step 203 for evaluation of said determined measure M. If it is determined in step 203 that the measure M exceeds a suitable limit value $M_{lim}$, the method continues to step 204, where the lambda margin $\Delta\lambda_m$ is set to the level $\Delta\lambda_{m0}$. By contrast, if it is determined in step 203 that the measure M is equal to or less than the limit value $M_{lim}$, the method continues to step 205 where the lambda margin $\Delta\lambda_m$ is reduced as a function of said measure M in order to allow the lambda value $\lambda$ to fall below the level $\lambda_{m0}$. According to one embodiment, it is determined only whether the measure M is equal to or less than the limit value $M_{lim}$, wherein the lambda value limit $\lambda_b$ in such a case is removed entirely, i.e. $\Delta\lambda_m$ is reduced to zero, and wherein $\lambda$ is thus allowed to fall even to the level $\lambda_b$ before action is taken, such as forcing of the turbo unit for build-up of combustion air pressure.

According to another embodiment of the invention, the lambda margin $\Delta\lambda_m$ is reduced as a function of the measure M determined in step 202, where $\Delta\lambda_m$, for example, can be adjusted such that $\lambda_m=\Delta\lambda_m+\lambda_b$ is adjusted to an arbitrary level between $\lambda_b$ and $\lambda_{m0}$, or a nearest of a plurality of fixed levels, based on said measure M. According to the present example, in step 205 $\lambda_m$ is reduced to a level $\lambda_{m1}$, illustrated by a dotted line in FIG. 4. As can be seen in FIG. 4, this means that, instead of actions to increase the combustion air pressure being taken already at the position $S_3$, the lambda value $\lambda$ is allowed to fall below the level $\lambda_{m0}$ in order, at the position $S_4$, to reach a minimum value, still exceeding the new margin $\lambda_{m1}$, before the lambda value $\lambda$ again begins to rise, on account of the combustion air pressure which is built up successively when the load increases.

Consequently, situations of the type shown in FIG. 4 can be managed without any, or at least without a full, lambda margin $\lambda_{m0}$ having to be applied, while at the same time the driver does not experience poorer driveability, since the power demand can still be met.

According to the present invention, the vehicle can therefore be driven over long distances with a reduced lambda margin, which in turn leads to lower combustion air pressure P needing to be maintained, with reduced losses from gas exchange work as a result. In the example shown in FIG. 4, for example, the vehicle would in normal circumstances probably be driven with a reduced lambda margin already at the position $S_0$, since driving along a flat road section would probably entail a reduced lambda margin, but, according to the present example, it is thus assumed that the present invention is first activated at the position $S_1$.

The method shown in FIG. 2 can be arranged to be run through continuously or at certain intervals such as once a second, or some other suitable interval, wherein the lambda margin will thus be able to vary with changes in the conditions under which the vehicle 100 is traveling. The method therefore returns to step 201 from step 205. When the measure M then exceeds the limit $M_{lim}$, the lambda margin $\lambda$ will be adjusted again to the level $\lambda_{m0}$ in accordance with the above, in order to provide good response when the driving conditions are changed to conditions that so requires.

Said measure M can be determined in any suitable way. For example, the measure M, for determining whether the vehicle is to be driven with a normal lambda margin or a fuel-saving lambda margin, can be determined with the aid of a suitable algorithm which is based on suitable parameters. In its simplest form, for example, the lambda margin can be arranged to be reduced if the speed of the vehicle exceeds some suitable speed, e.g. because it can be assumed that significant increases in torque are not especially common when the vehicle is driven at this suitable speed. If, for example, the vehicle is driven at a cruising speed, it can be assumed that the surrounding conditions and thus the driving power requirement are changed relatively slowly, whereby it is also very probable that the lambda margin can be reduced without this negatively affecting the driveability of the vehicle.

According to one embodiment, the lambda margin is reduced only if the cruise control is activated, since in this case there is less likelihood that sudden and unpredictable increases in the required torque will arise.

According to one embodiment, the lambda margin is reduced only if the speed exceeds some suitable speed and if a cruise control function is activated.

According to another embodiment, it is determined whether the variation in the speed of the vehicle during some suitable period, such as a certain number of seconds back in time, has undershot some suitable speed variation. A small speed variation indicates that the need for rapid response is low, and the lambda margin can thus be reduced.

Another example of a parameter that can be used is the slope ahead of the vehicle. Vehicles of the type shown can also comprise what is called a Look Ahead Cruise Control (LACC) which, with the aid of map data and position data, can determine how the route ahead of the vehicle looks. If, during such determination, it can be determined that the slope of the coming road section, during a suitable period, will not entail a torque demand that exceeds some suitable value, this can be used as a measure, and the lambda margin can be reduced.

In the determination of the lambda margin, the relation between how great the available engine power is and the current train weight of the vehicle can also be taken into account. Consequently, the criterion for reducing the lambda margin can depend on how heavily loaded the vehicle is. According to another embodiment, it is determined how quickly the lambda value $\lambda$ is reduced when the driving resistance increases, e.g. between the positions $S_2$ and $S_3$ in FIG. 4, and, if the reduction of the lambda value $\lambda$ per unit of time is below a suitable value, the lambda margin can be reduced as in the example shown in FIG. 4.

According to one embodiment of the present invention, use is made of logic from the gear selection control of the vehicle, where it is possible to determine the extent of the torque margin at the existing gear before it is necessary to change down gear, wherein this is used as measure M. As long as the margin exceeds a suitable margin, the lambda margin can be reduced. When the margin then falls below said limit, the margin can be increased again to the normal lambda margin in order to provide good driveability when so required.

As previously mentioned, it is possible, according to one embodiment, for the lambda margin to be completely eliminated when this is deemed suitable. According to another embodiment, the lambda margin is reduced in relation to the value of the measure M that has been determined in step 202. All in all, the present invention thus results in a method which, in many situations, can reduce the lambda margin and therefore losses in gas exchange work, with reduced fuel consumption as a result, without this affecting the driveability of the vehicle.

The present invention is not limited to the above-described embodiments of the invention and instead it relates to and comprises all embodiments within the scope of protection of the accompanying independent claims.

The invention claimed is:

1. A method for controlling an air/fuel ratio when driving a vehicle, wherein said vehicle comprises an internal combustion engine with at least one combustion chamber a controllable air supply to said combustion chamber, the method comprising the steps of:
controlling said air/fuel ratio in said combustion chamber such that said air/fuel ratio does not fall below a first limit value ($\lambda_b$);
controlling said air/fuel ratio such that a first margin ($\Delta\lambda_{m0}$) with respect to said first limit value ($\lambda_b$) of said ratio is maintained;
determining a first measure of a requirement for a margin with respect to said first limit value ($\lambda_b$); and
reducing said first margin ($\Delta\lambda_{m0}$) with respect to said first limit value ($\lambda_b$) to a second margin ($\Delta\lambda_{m1}$) smaller than said first margin if said first measure of said requirement for said margin represents a reduced requirement for the margin with respect to said first limit value.

2. The method according to claim 1, wherein a size of said reduction of said first margin ($\Delta\lambda_{m0}$) is based on said first measure.

3. The method according to claim 1, wherein said controlling of said air/fuel ratio such that said first margin ($\Delta\lambda_{m0}$) with respect to said first limit value ($\lambda_b$) is maintained, is accomplished, at least partially, by controlling pressure and/or flow of the air supplied to said combustion chamber.

4. The method according to claim 1, further including reducing said first margin ($\Delta\lambda_{m0}$) with respect to said first limit value ($\lambda_b$) to one of a plurality of margins ($\Delta\lambda_m$) each being smaller than said first margin.

5. The method according to claim 1, further including: determining said first measure continuously or at intervals over time, and increasing or decreasing said first margin ($\Delta\lambda_{m0}$) with respect to said first limit value ($\lambda_b$) based on said first measure.

6. The method according to claim 1, wherein said first measure is at least partially based on one or more selected from the group consisting of:
a parameter value concerning the progress of the vehicle;
a speed of the vehicle exceeds a first speed; activating a cruise control function;
data concerning a running surface of the vehicle in front of the vehicle;
available engine power in relation to whether an existing vehicle weight exceeds a limit;
a change over time in a speed of the vehicle;
a change over time in a driving resistance of the vehicle;
a change over time in the air/fuel ratio falling below a limit.

7. The method according to claim 1, further comprising reducing said first margin ($\Delta\lambda_{m0}$) with respect to said first limit value ($\lambda_b$) to substantially zero.

8. The method according to claim 1, wherein said first margin ($\Delta\lambda_{m0}$) is a stoichiometric ratio of said air/fuel ratio in said combustion chamber multiplied by a first factor in the range 1.2-1.5.

9. The method according to claim 1, wherein said second margin ($\Delta\lambda_{m1}$) is a stoichiometric ratio multiplied by a second factor in the range 1.0-1.3.

10. The method according to claim 1, further comprising, if said first margin ($\Delta\lambda_{m0}$) with respect to said first limit value ($\lambda_b$) has been reduced to said second margin ($\Delta\lambda_{m1}$):
resetting said first margin ($\Delta\lambda_{m0}$) with respect to said first limit value ($\lambda_b$) if said first measure of said requirement for said margin no longer represents a reduced requirement for said margin with respect to said first limit value.

11. The method according to claim 1, wherein said first limit value is equal to or greater than a lowest limit value permitted by manufacturers or regulatory authorities when driving said vehicle.

12. The method according to claim 1, wherein said first limit value ($\lambda_b$) is a higher value compared to a value of a stoichiometric ratio.

13. The method according to claim 1, further comprising only reducing said first margin ($\Delta\lambda_{m0}$) with respect to said first limit value ($\lambda_b$) when a sudden increase in a torque demand from said internal combustion engine is not expected.

14. The method according to claim 1, wherein said first measure of said requirement for said margin with respect to said first limit value ($\lambda_b$) occurs during driving of said vehicle under non-transient conditions.

15. The method according to claim 1, further including driving said vehicle at said second margin with respect to said first limit value ($\lambda_b$), until a new margin with respect to said first limit value ($\lambda_b$) is determined based on a new measure (M) of the requirement for said margin with respect to said first limit value ($\lambda_b$).

16. A computer program product comprising a non-volatile computer-readable medium and computer program code of a computer program is stored on said medium, wherein executing said program code in a computer causes one or more control units or another computer connected to said one or more control unit to perform the method according to claim 1.

17. A system for controlling an air/fuel ratio when driving a vehicle, wherein said vehicle comprises an internal combustion engine with at least one combustion chamber and means for controlling air supply to said combustion chamber, wherein, said system includes
   means for controlling said air/fuel ratio in said combustion chamber such that said air/fuel ratio does not fall below a first limit value ($\lambda_b$);
   means for controlling combustion in said combustion chamber such that a first margin ($\Delta\lambda_{m0}$) with respect to said first limit value ($\lambda_b$) is maintained;
   means for determining a first measure of a requirement for a margin with respect to said first limit value ($\lambda_b$); and
   means for reducing said first margin ($\Delta\lambda_{m0}$) with respect to said first limit value ($\lambda_b$) to a second margin, if said first measure (M) of said requirement represents a reduced requirement for said margin with respect to said first limit value, wherein said second margin is smaller than said first margin.

18. The system according to claim 17, wherein said internal combustion engine is a diesel engine.

19. A vehicle comprising a system according to claim 17.

* * * * *